(12) United States Patent
Kuo

(10) Patent No.: US 6,929,419 B1
(45) Date of Patent: Aug. 16, 2005

(54) TRAFFIC CONE

(76) Inventor: Wen-Nan Kuo, P.O. Box 2-10, Tainan City (TW)

( * ) Notice: Subject to any disclaimer, the term of this patent is extended or adjusted under 35 U.S.C. 154(b) by 26 days.

(21) Appl. No.: 10/917,100

(22) Filed: Aug. 13, 2004

(51) Int. Cl.[7] .............................................. E01F 9/12
(52) U.S. Cl. ...................................... 404/6; 116/63 C
(58) Field of Search ........................................ 404/6, 9

(56) References Cited

U.S. PATENT DOCUMENTS

| | | | |
|---|---|---|---|
| 3,913,518 A * | 10/1975 | Kaplan ...................... | 116/63 C |
| 4,979,461 A * | 12/1990 | Provence, Jr. ............ | 116/63 C |
| 5,036,791 A * | 8/1991 | Thurston .................. | 116/63 C |
| 5,199,813 A * | 4/1993 | Nagler .......................... | 404/9 |
| 5,560,732 A * | 10/1996 | Kulp et al. .................... | 404/10 |
| 5,888,016 A * | 3/1999 | Ahn ............................. | 404/10 |
| 6,053,657 A * | 4/2000 | Signorelli ...................... | 404/6 |
| 6,199,504 B1 * | 3/2001 | Freeman .................. | 116/63 C |

* cited by examiner

Primary Examiner—Thomas B. Will
Assistant Examiner—Raymond W. Addie

(57) ABSTRACT

A traffic cone includes a frustum-conical body and a base. The frustum-conical body has a hole in an upper end surface for a signal lamp, and a partial portion of its circumferential wall is thicker than another portion to form a gap between every two traffic cones stacked-up for easily taken off. The frustum-conical body has its bottom formed with a flange consisting of an upper and a lower annular wall and short ribs formed between the upper and the lower annular wall. The upper and the lower annular wall respectively have connect holes facing one another. The upper annular wall has an auxiliary material filling holes beside every connect hole and the lower annular wall has projecting arms. The base has a center hole to fit around the flange of the frustum-conical body to be combined with the same body as integral.

3 Claims, 7 Drawing Sheets

TRAFFIC CONE

FIELD OF THE INVENTION

This invention relates to a traffic cone, particularly to one having a frustum-conical body and a base separately fabricated and colored differently. When automobiles accidentally hit the traffic cone, the base can separate from the frustum-conical body, not jumbling with the conical body to better traffic safety.

BACKGROUND OF THE INVENTION

A traffic delineator disclosed in U.S. Pat. No. 6,014,941 includes a cylinder and a base, and the base has a hole for the cylinder body to fit in to let the traffic delineator to stand stably on a road. Further, a handle is provided on the cylinder for carrying the traffic delineator, and a signal lamp, a sign, or the like can be inserted in a hole in the handle. In addition, the outer smooth surface has reflective sheets stuck thereon, and a channel formed as a grip for portability. Moreover, the cylinder has a flange extending outward to be pressed by the base to keep the cylinder stably on the ground.

Another traffic delineator disclosed in U.S. Pat. No. 5,722,788 includes a barrel, and a lip formed in the lower end and a base. The base has an overhand, so the lip of the barrel sticking in the overhand to combine the barrel with the base together.

Another traffic delineator disclosed in U.S. Pat. No. 6,536,369 B1 includes a cylinder and a base. The base has a hole for the cylinder to fit in to let the traffic delineator to stand stably on the ground. The cylinder has a T-shaped handle for carrying, and the handle has a hole for installing a signal lamp or the like.

Another traffic delineator disclosed in U.S. Pat. No. 5,908,262 includes a cylindrical post and a supplemental support panel having a hole for the cylindrical post to fit therein to enable the traffic delineator to stand stably on the ground.

Another delineator disclosed in U.S. Pat. No. 5,451,118 includes a barrel with a lip in its lower end and a base. The base has an overhand, so the lip can stick in the overhand of the base for combining the barrel with the base.

One more traffic delineator in U.S. Pat. No. 5,421,668 includes a cylinder and a base made of a recycled heavy tire having a center hole for the cylinder to fit therein to let the traffic delineator to stand stably on the ground.

The conventional traffic delineators referred to above generally have the cylinder or the barrel and the base separately fabricated and then combined together. So the cylinder or the barrel is liable to separate from the base in carrying or transporting to cause troubles, and moreover, they are impossible to be stacked one by one to save space for storing, transporting or packing.

SUMMARY OF THE INVENTION

This invention has been devised to offer a traffic cone consisting of a frustum-conical body of a color and a base of a different dark color from that of the conical body and made of recycled plastic so that the base can separate from the frustum-conical body when the traffic cone receive external applied large forces, upgrading safety in traffic.

One feature of the invention is a frustum-conical body is made with its partial wall thicker than that of another partial wall, so the stacked-up traffic cones have a small gap between one another for ease of taking off.

A second feature of the invention is the frustum-conical body is provided with a connect flange consisting of an upper annular wall and a lower annular wall and a plurality of small ribs provided between the upper and the lower annular wall and a plurality of connect holes provided in the upper and the lower periphery respectively facing one another, and the upper annular wall further has an auxiliary material filling hole beside every connect hole, and the lower annular wall has plural projecting-out arms.

A third feature of the invention is the frustum-conical body is combined with the base by placing it in a mold used for molding a base to let the center hole of the base surrounding integral the connect flange of the frustum-conical body in the process of injecting molding the base.

A fourth feature of the invention is the heavy weight of the base that makes the center of gravity located rather low to enable the traffic cone to stand stably on the ground, not tipping easily.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
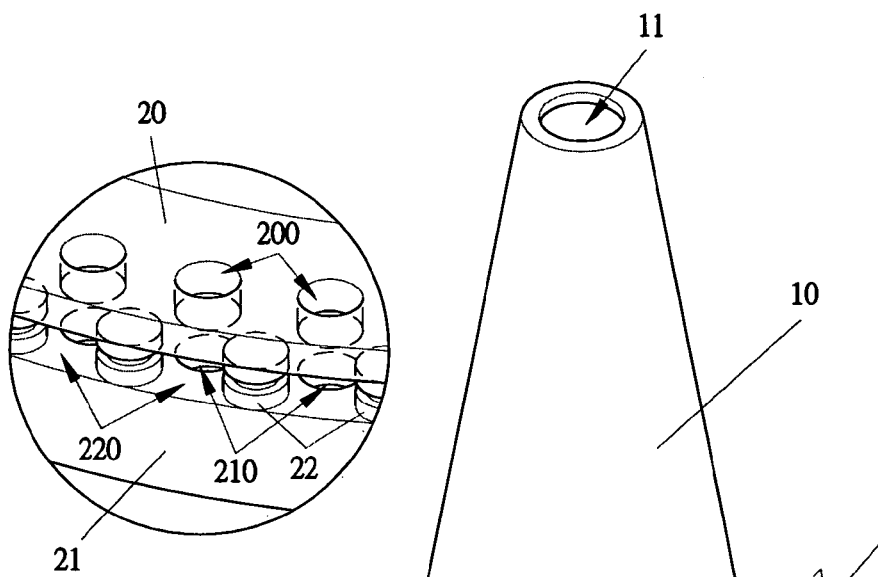
FIG. 2 is a magnified view of the part marked (A) in FIG. 1.
Figure 1:
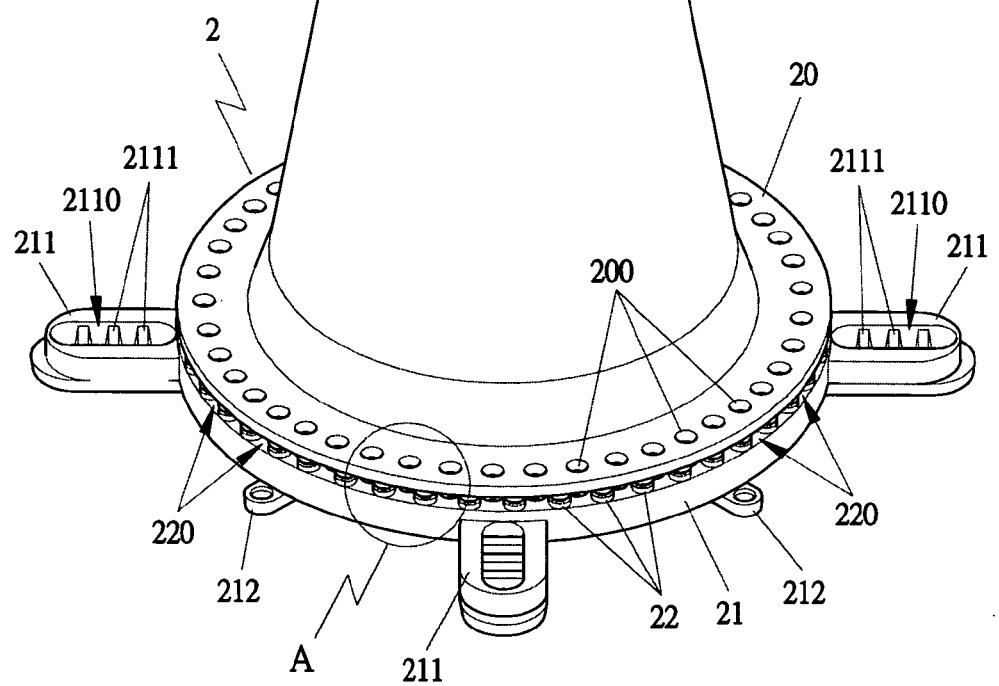
FIG. 1 is a perspective view of a conical body of a traffic cone in the present invention.

A preferred embodiment of a traffic cone in the present invention, as shown in FIGS. 1 N 6, includes a frustum-conical body 1 and a base 3 combined together.

Figure 12:
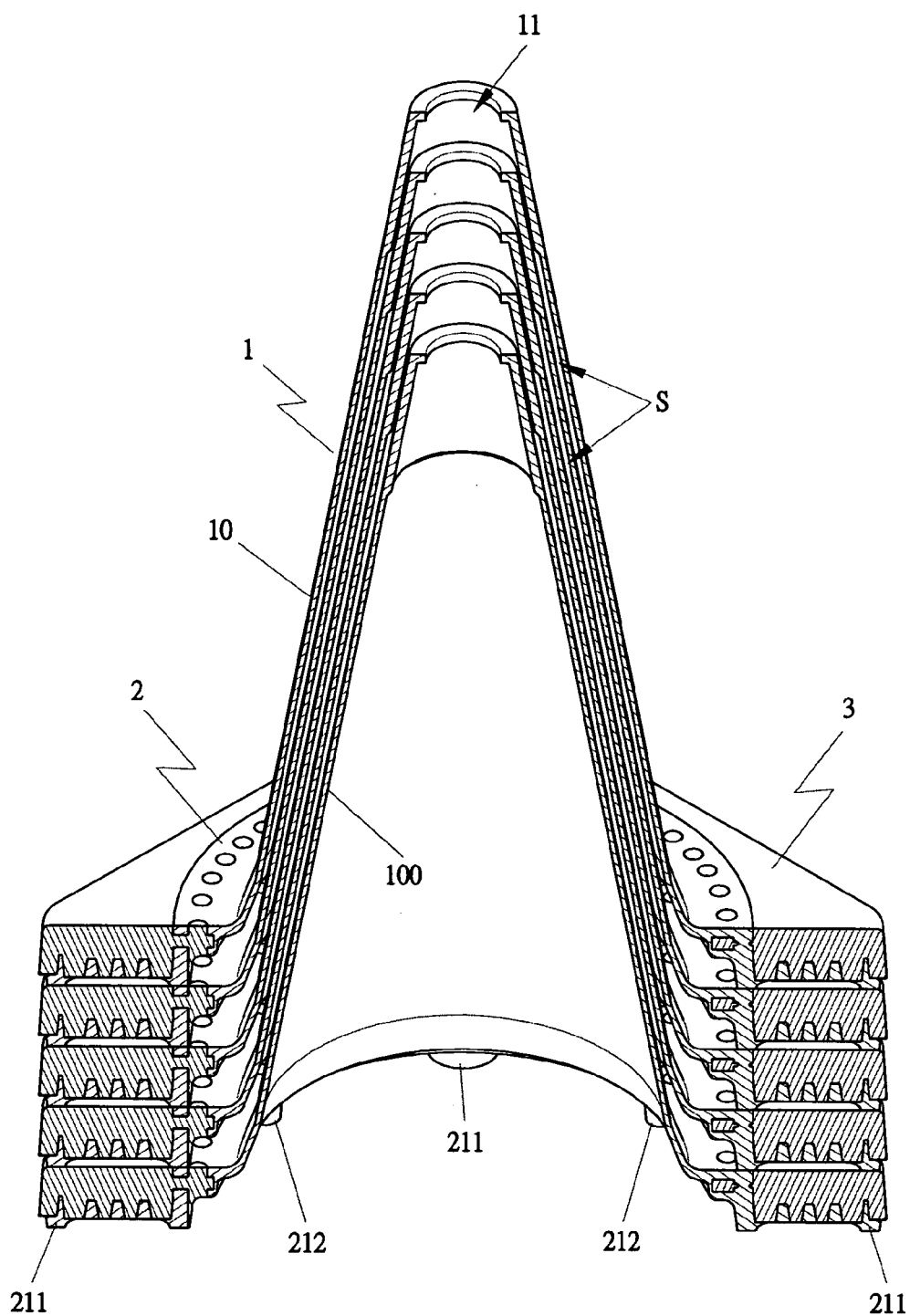
FIG. 12 is a cross-sectional view of the traffic cones stacked one on another in the present invention.

The frustum-conical body 1 has a circumferential tapered wall 10, a hole 11 formed in an upper flat surface for a signal lamp or the like to insert therein, an inner surface 100 of the circumferential wall with an L1 portion with a thickness D1 and a L2 portion with a thickness D2 thinner than the D1 so that every two traffic cones may have a small gap (S) between them at the L1 portions in case they are stacked up as shown in FIG. 12. Thus, the stacked-up traffic cones can be easily taken off, otherwise they may stick with each other tightly.

Figures 3, 4:
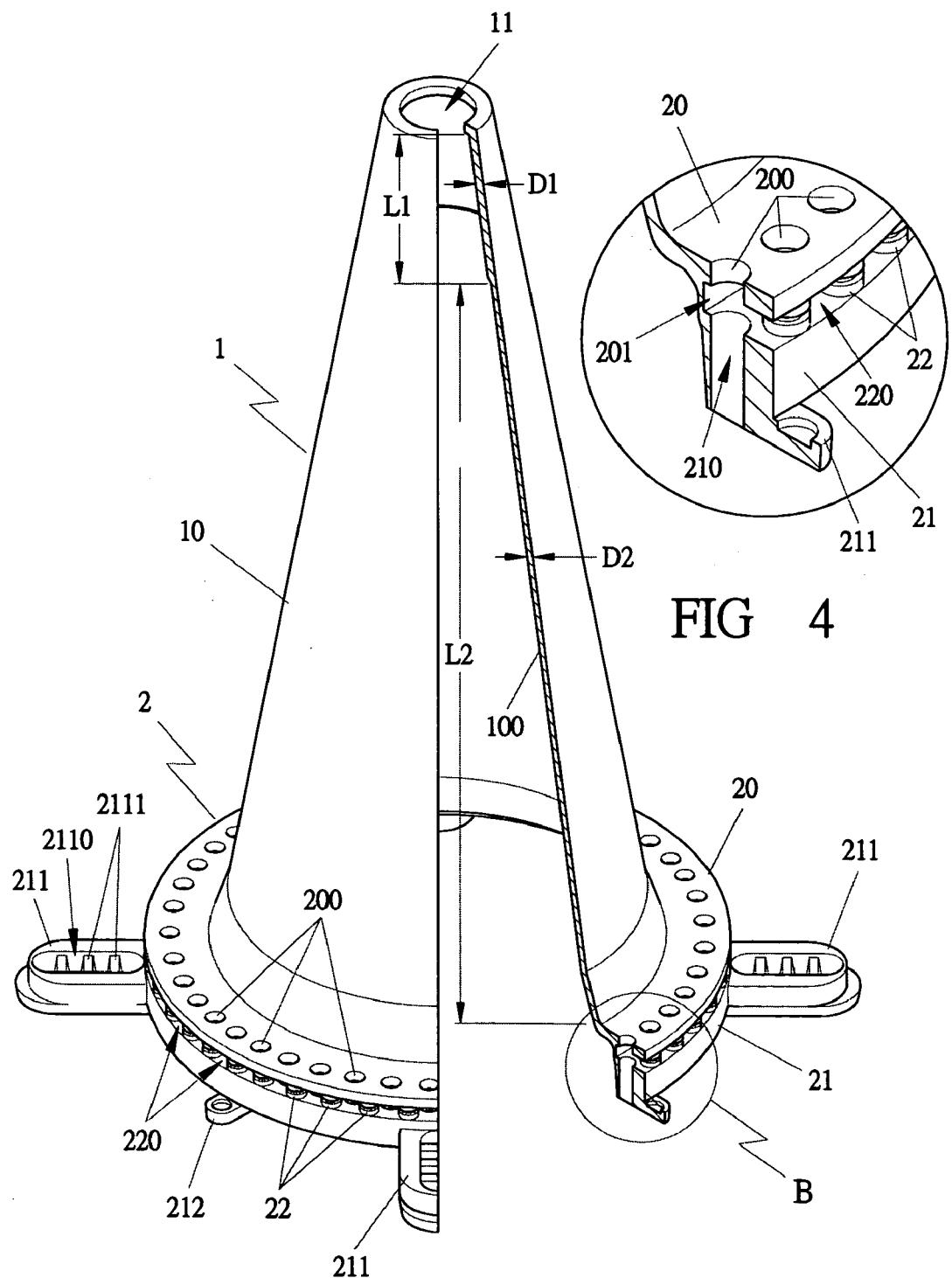
FIG. 3 is a partial cross-sectional view of the conical body of a traffic cone in the present invention.
FIG. 4 is a magnified view of the part marked (B) in FIG. 3.
Figures 5, 6:
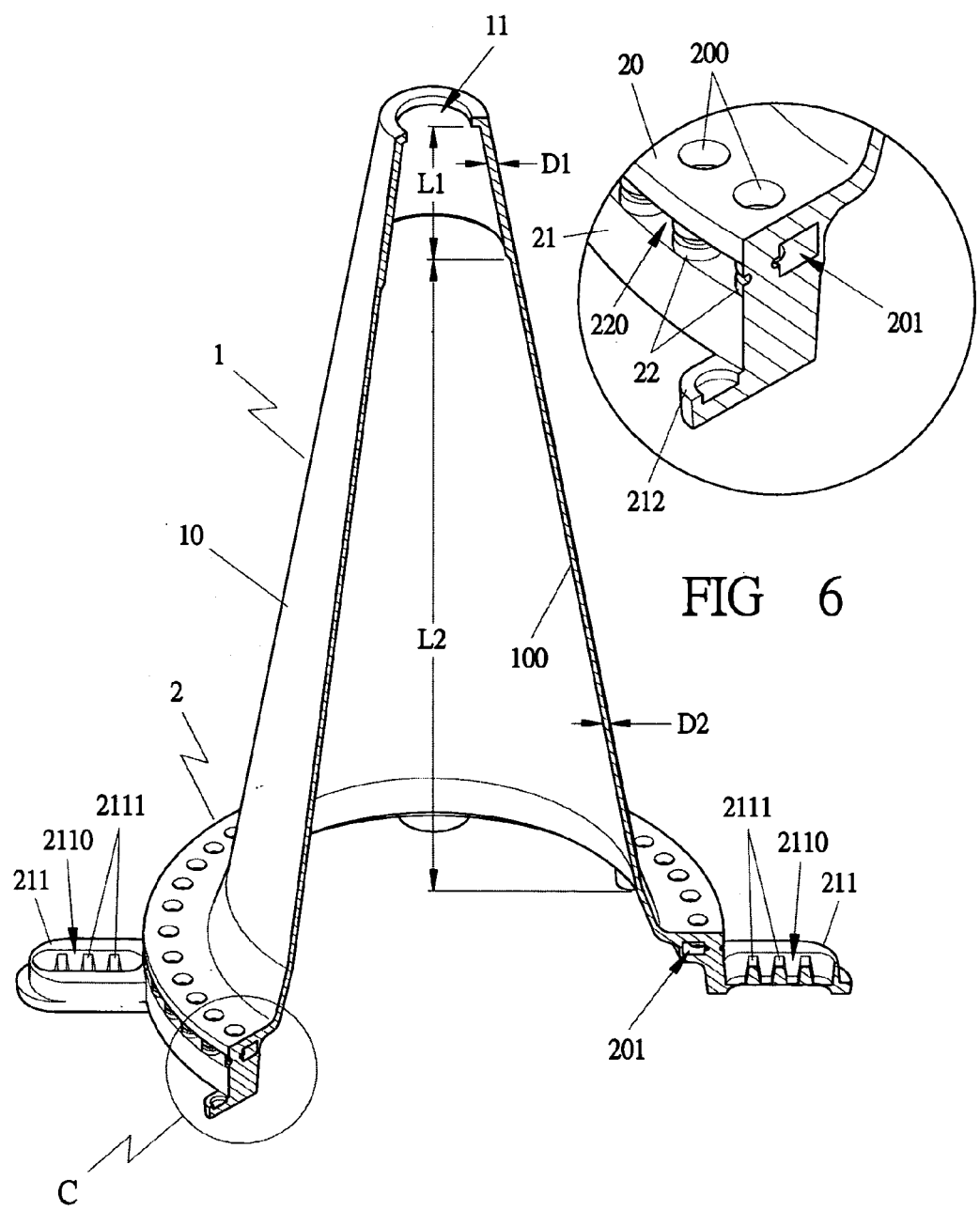
FIG. 5 is a cross-sectional view of the conical body of the traffic cone in the present invention.
FIG. 6 is a magnified view of the part marked (C) in FIG. 5.

The frustum-conical body 1 further has a connect flange 2, consisting of an upper annular wall 20 and a lower annular wall 21, and plural small ribs 22 spaced apart equidistantly between the upper and the lower periphery 20 and 21, and a material fitting gap 220 formed between every two ribs 22 as shown in FIGS. 1 N 4. The upper and the lower annular wall 20 and 21 further have plural combine holes 200 and 201 respectively facing one another, as shown in FIGS. 3 and 4. An auxiliary material filling groove 201 is provided beside each combine hole 200 as shown in FIGS. 5 and 6, and the lower annular wall 21 further has plural projecting arms 211, 212 extending outward in a right angle position therebetween, in order to combine tightly the frustum-conical body 1 with the base 3. Therefore, the projecting arms 211 and 212 can reinforce combination of the base 3 with the frustum-conical body 1', which can stand stably of itself by means of the projecting arms 211 and 212 when the base 3 separates from the frustum-conical body 1 by external applied forces. The projecting arms 211 respectively have a hole 2110 and plural ribs 2111 for keeping the frustum-conical body 1 better combined with the base 3.

Figure 7:
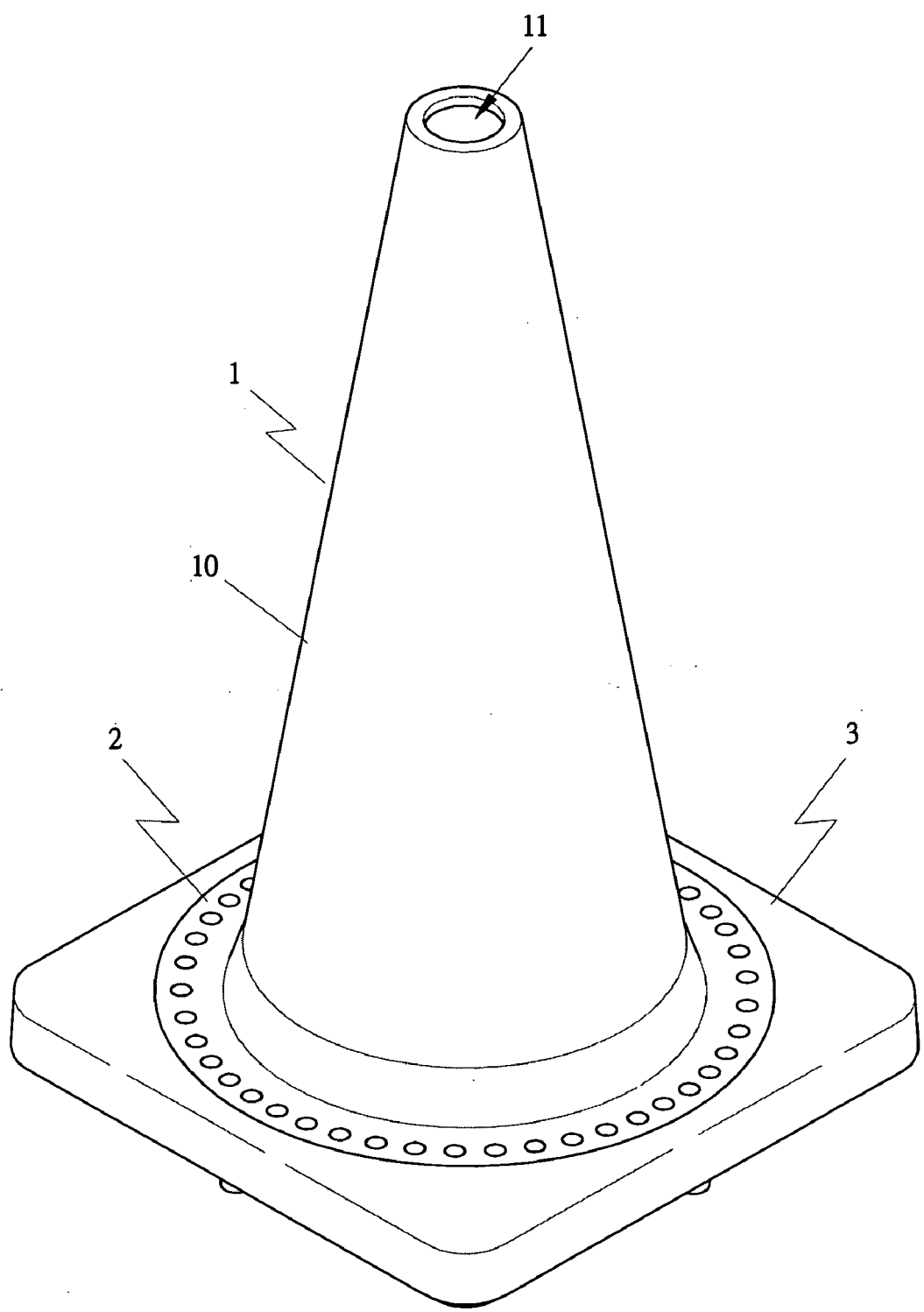
FIG. 7 is a perspective view of the traffic cone in the present invention.
Figures 8, 9:
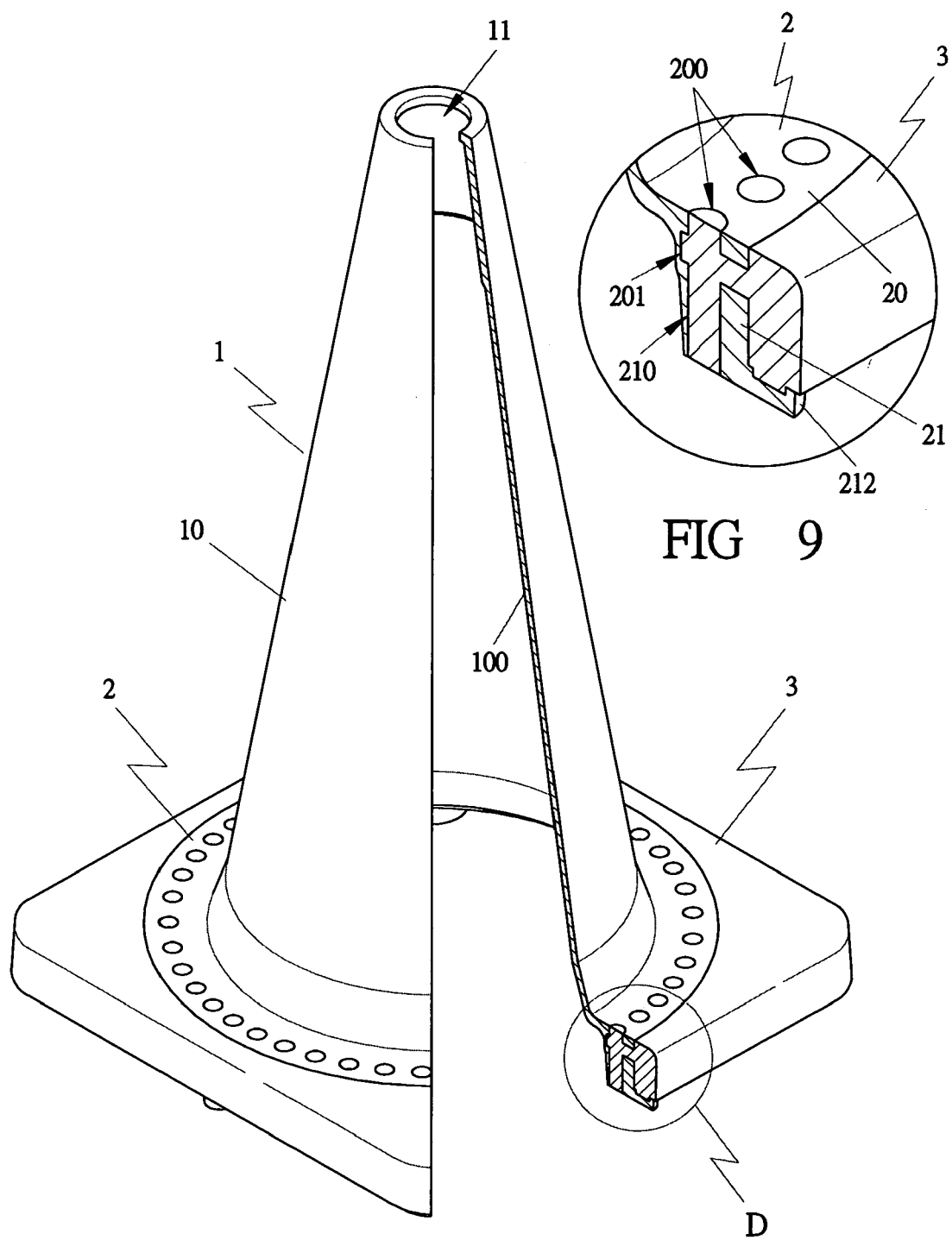
FIG. 8 is a cross-sectional view of the traffic cone in the present invention.
FIG. 9 is magnified view of the part market (D) in FIG. 8.
Figures 10, 11:
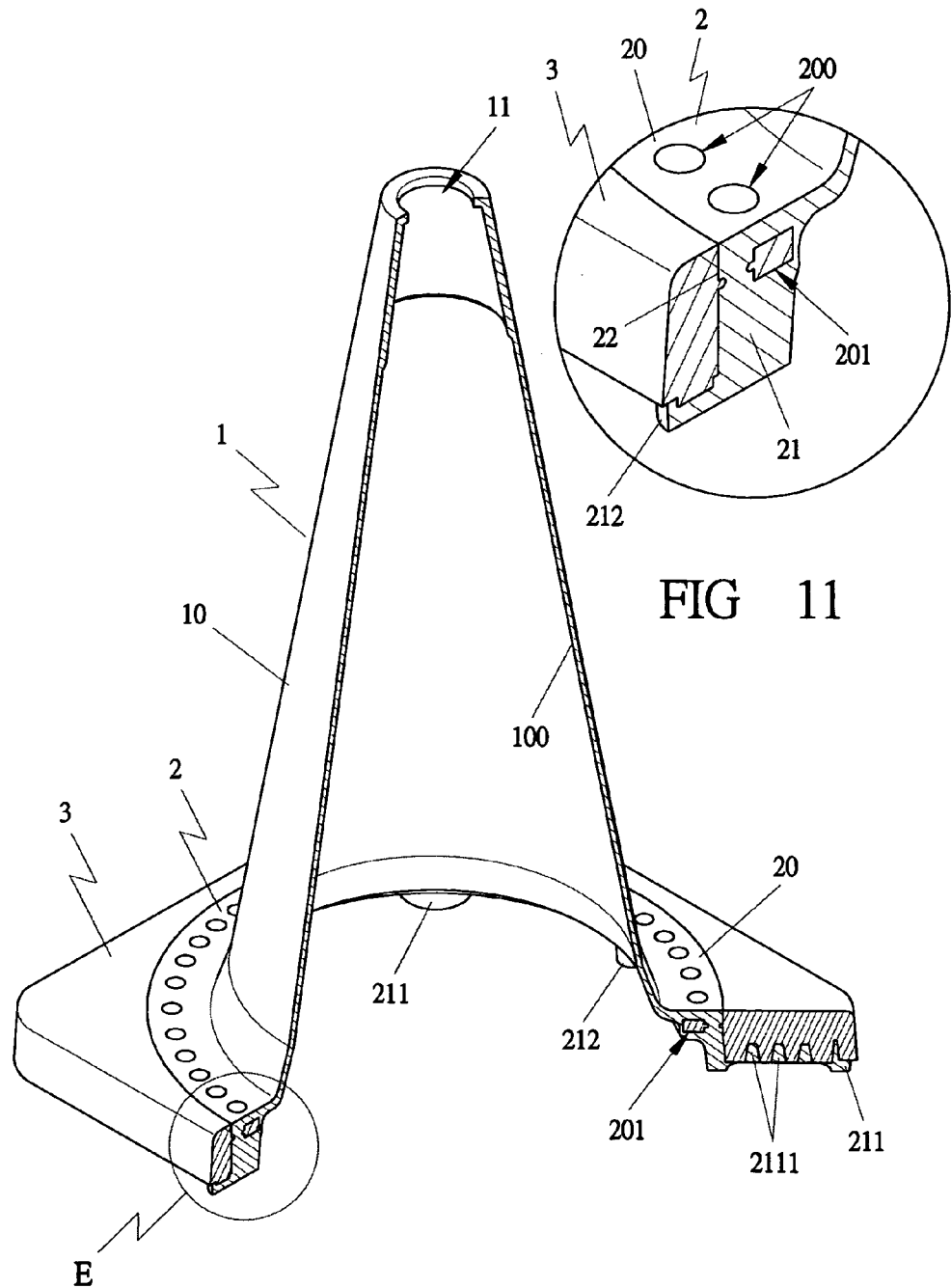
FIG. 10 is another cross-sectional view of the traffic cone in the present invention.
FIG. 11 is a magnified view of the part marked (E) in FIG. 10.

The base 3' is formed by injecting molding process, but the finished frustum-conical body 1 is to be placed in the mold used for molding the base, and after the base is finished in its molding, the connect flange 2 of the frustum-conical body 1 is tightly surrounded by the inner surface of a center hole of the base 3 to make the both 1 and 3 as integral, as shown in FIGS. 7 N 11. Further, the connect holes 200 and 210 (shown in FIGS. 8 and 9) of the upper and the lower annular wall 20 and 21, the gaps 220, the material filling grooves 201 (shown in FIGS. 10 and 11), and the projecting arms 211 and 212 (shown in FIGS. 8, 9 and 12) all together are filled with the material of the base 3 during the molding process of the base 3.

In general, the traffic cone according to the invention has its center of gravity located low at the base, not easily tipping, and the colors of the frustum-conical body 1 and the base 3 are different, with the color of the case more darker so as not easily looks like to be smeared. In addition, the material of the traffic cone can be recycled, to let its cost lessened. Besides, should the traffic cone be hit or run over by an automobile with a lower chassis, the base 3 may be easily separated from the frustum-conical body 1, upgrading the safety of traffic.

While the preferred embodiment of the invention has been described above, it will be recognized and understood that various modifications may be made therein and the appended claims are intended to cover all such modifications that may fall within the spirit and scope of the invention.

What is claimed is:

1. A traffic cone comprising:
    a frustum-conical body 1 having a hole 11 formed in its upper end surface, a connect flange 2 formed at its lower end and consisting of an upper annular wall 20 and a lower annular wall 21, a plurality of short ribs 22 provided spaced apart equidistantly between said upper annular wall 20 and said lower annular wall 21, a material filling gap 220 formed between every two of said short ribs for material of a base to be filled therein, said upper annular wall 20 and said lower annular wall 21 respectively provided with a plurality of connect holes 200 and 210 spaced apart equidistantly to face one another, an auxiliary material filling hole 201 formed beside every said connect hole 200 of said upper annular wall 20, and plural arms 211 and 212 extending out of said lower annular wall 21 and spaced apart from each other in the right angle:
    a base 3 combined as integral with and surrounding said connect flange 2 of said frustum-conical body 1, the material of said base 3 filling in said gaps 220 between said upper and said lower annular wall 20 and 21, in said connect holes 200 and 210 of said upper and said lower annular wall 20 and 21, in said auxiliary material filling holes 201 and in said projecting arms 211 and 212.

2. A traffic cone comprising a frustum-conical body 1, said frustum-conical body 1 provided with a circumferential tapered wall 10, said circumferential tapered wall 10 having its wall thickness D1 of the wall portion on an L1 portion and its wall thickness D2 of the wall portion down the L1 portion, the thickness D1 being larger than the thickness D2 so that every two traffic cones stacked-up may have a small gap (S) between them.

3. The traffic cone as claimed in claim 1, wherein said plural projecting arms 211 and 212 of said lower annular wall 21 of said connect flange 2 are located at four points on the outer periphery of said lower annular wall spaced apart to form a right angle between every two ones.

* * * * *